United States Patent [19]

Park

[11] Patent Number: 5,371,549
[45] Date of Patent: Dec. 6, 1994

[54] DECODING METHOD AND SYSTEM FOR PROVIDING DIGITAL TELEVISION RECEIVERS WITH MULTIPICTURE DISPLAY BY WAY OF ZERO MASKING TRANSFORM COEFFICIENTS

[75] Inventor: Hak-Jae Park, Incheon, Rep. of Korea

[73] Assignee: Daewoo Electronics Co., Ltd., Seoul, Rep. of Korea

[21] Appl. No.: 133,664

[22] Filed: Oct. 7, 1993

[30] Foreign Application Priority Data

Oct. 7, 1992 [KR] Rep. of Korea ............ 92-18395

[51] Int. Cl.$^5$ ............ H04N 7/13; H04N 5/262
[52] U.S. Cl. ............ 348/564; 348/402
[58] Field of Search ............ 358/133, 135, 136, 12, 358/13, 183; 348/564, 565, 402, 568; H04N 5/262, 7/12, 7/13

[56] References Cited

U.S. PATENT DOCUMENTS 5,157,743 10/1992 Maeda et al. ............ 358/12 X

*Primary Examiner*—Victor R. Kostak
*Attorney, Agent, or Firm*—William F. Pinsak

[57] ABSTRACT

Disclosed herein is a novel method and system for providing digitized television receivers with a multipicture display capability by zero masking high frequency transform coefficients. The system comprises means for decoding a signal for each of equal-sized subpictures by setting at zero those transform coefficients which lie outside a subblock of transform coefficients including a d.c. transform coefficient formed from a block of transform coefficients. Interpolation of pixel data is performed by applying appropriate weight factors on neighboring pixels based on the spatial relationship between a head of a reduced motion vector and its neighboring pixels.

6 Claims, 3 Drawing Sheets

DECODING METHOD AND SYSTEM FOR PROVIDING DIGITAL TELEVISION RECEIVERS WITH MULTIPICTURE DISPLAY BY WAY OF ZERO MASKING TRANSFORM COEFFICIENTS

FIELD OF THE INVENTION

The present invention pertains to a decoding method and system for a high definition television(HDTV) receiver equipped with the ability to display different images on equal-sized subareas of a screen.

DESCRIPTION OF THE PRIOR ART

Transmission of digitized television signals can deliver video images of much higher quality than that of analog signals. When an image signal comprising a sequence of image frames is expressed in a digital form, a substantial amount of data need be transmitted, especially in the case of a HDTV system. Since, however, the available frequency bandwidth of a conventional transmission channel is limited, in order to transmit substantial amounts of digital data, e.g., about 900 Mbits per second, through the limited channel bandwidth, e.g., of 6 MHz, it is inevitable to compress the image signal.

Among various video compression techniques, the so-called hybrid coding technique, which combines spatial and temporal compression techniques, is known in the art to be most effective.

Most hybrid coding techniques employ a motion-compensated DPCM(Differential Pulse Code Modulation), two-dimensional DCT(Discrete Cosine Transform), quantization of DCT coefficients, RLC(Run-Length Coding) and VLC(Variable Length Coding). The motion-compensated DPCM, wherein an image frame is divided into a plurality of subimages(or blocks), is a process of determining the movement of an object between a current frame and its previous frame, and predicting the current frame according to the motion flow to produce a predictive error signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures, *IEEE Transaction on Communications*, COM-30, No. 1(January, 1982).

The two-dimensional DCT converts a block of digital image signal, for example, a block of 8×8 pixels, into a set of transform coefficients. This technique is described in Chen and Pratt, "Scene Adaptive Coder", *IEEE Transactions on Communications*, COM-32, No. 3(March 1984). By processing such transform coefficient data with a quantizer, zigzag scanning, RLC and VLC, the amount of data to be transmitted can be effectively compressed. The motion vectors obtained by the motion-compensated DPCM are also coded by VLC.

Recently, an increasing member of conventional analog television sets and video cassette recorders(VCRs) are provided with a multipicture display feature. In such a television receiver or VCR capable of simultaneously displaying a number of pictures on a screen, the screen is divided into, for instance, up to sixteen equal-sized subareas each of which displays a complete picture of a reduced size.

SUMMARY OF THE INVENTION

It is a primary object of the present invention to provide a novel decoding method and system so as to make it possible to implement a multipicture display system in a HDTV receiver.

In accordance with the present invention, there is presented a novel digitized video signal processing method for simultaneously displaying a plurality of equal-sized subpictures on a screen, by way of decoding a signal for each of the equal-sized subpictures by setting at zero those transform coefficients which lie outside a subblock of P/N×Q/N transform coefficients including a d.c. coefficient formed from a block of P×Q transform coefficients, wherein P, Q, N, P/N and Q/N are all positive integers with N being a reduction ratio between each of said equal-sized subpictures and the screen with respect to both the horizontal and the vertical lengths thereof.

Further, in accordance with the present invention, there is disclosed a novel digitized video signal processing system for simultaneously displaying a plurality of equal-sized subpictures on a screen, comprising means for decoding a signal for each of said equal-sized subpictures by setting at zero those transform coefficients which lie outside a subblock of P/N×Q/N transform coefficients including a d.c. coefficient formed from a block of P×Q transform coefficients, wherein P, Q, N, P/N and Q/N are all positive integers with N being a reduction ratio between each of said equal-sized subpictures and the screen with respect to both the horizontal and the vertical lengths thereof.

In accordance with one aspect of the invention, a HDTV receiver is provided with a multipicture display feature by setting those transform coefficients representing high frequency components at zero without performing a digital filtering process thereof.

In accordance with another aspect of the present invention, interpolation of pixel data for each of the subpictures is performed based on the spatial relationship between modified motion vectors of the subpicture of a current frame and their corresponding neighboring pixels in its preceding frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
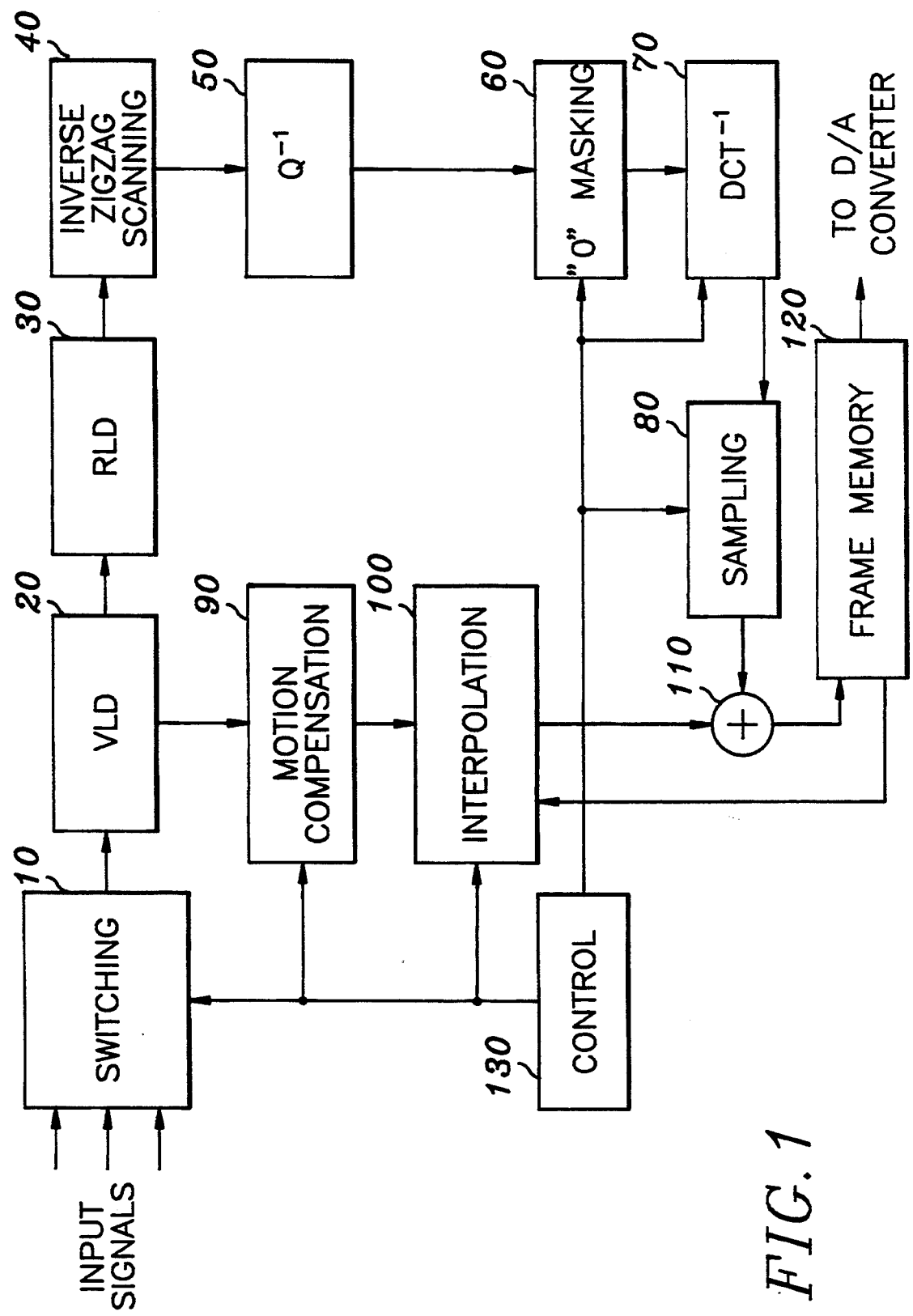
FIG. 1 is a block diagram of a decoding system in accordance with the present invention for providing a HDTV receiver with a multipicture display feature.

FIG. 1 is a block diagram schematically showing a decoding system for enabling the implementation of a multipicture display in HDTV receivers. A plurality of encoded digital video signals is inputted to a switching block 10. Each of the input video signals may be of any compressed bit stream encoded in the same manner as is done in a HDTV transmitter. For instance, the input signals can be supplied from tuner(s) of television receivers and/or VCRs or any other video source encoded in a HDTV standard.

Figures 2, 3:
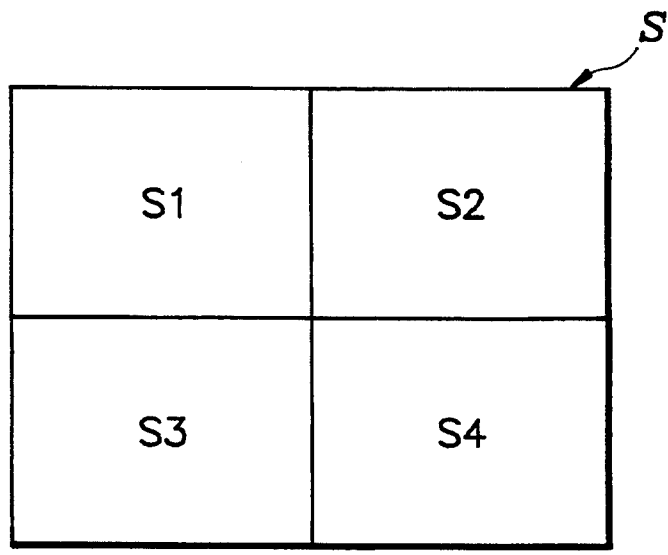
FIG. 2 shows a typical multipicture display on a screen which is divided into four equal-sized subareas.
FIG. 3 depicts DCT coefficients after "zero" masking of those DCT coefficients corresponding to high frequency components in accordance with the invention.

FIG. 2 shows a typical multipicture display on a screen S which is divided into four equal-sized subareas S1, S2, S3 and S4 which can display up to four different video signals in their respective subareas. When a single video signal is reproduced simultaneously in the four subareas, each subarea will shift from a live to a still state in sequence with other subareas, giving a strobing progression of still images cycling from S1 to S4. In a channel search mode, for example, up to four scannable channels or programs may be displayed giving either still or storing images in their subareas. These subareas may have different frame frequencies. When the subareas S1, S2 and S3 display a strobing progression of a channel and the subarea S4 alone serves to check whether or when a particular program begins, the frame frequency of S4 can be reduced while the frame frequencies for the subareas S1, S2 and S3 are increased.

Referring back to FIG. 1, input video signals are selected by a switching block 10 and fed to a variable length decoding(VLD) block 20. Selection of the input video signals is controlled in accordance with the corresponding frame frequencies of the subareas via a switching signal from a control block 130. In a normal mode, i.e., without a multipicture display, only one input signal is selected by the switching block 10 and transferred to the VLD block 20. The input signal to the VLD block 20 includes variable length coded motion vector data and DPCM signal which represents the difference between a block of a current frame and a corresponding block of its preceding frame after motion compensation. The VLD block 20 decodes the variable length coded DPCM and motion vector data to send the DPCM data to a run-length decoding(RLD) block 30 and the motion vector data to a motion compensation block 90. The VLD block 20 is basically a look-up table: that is, in VLD block 20, a plurality of code sets is provided to define a respective relationship between each variable length code and its run-length code or motion vector. The DPCM data decoded to its run-length code is applied to the RLD block 30, which is also a look-up table, for generating quantized discrete cosine transform(DCT) coefficients. In an inverse zigzag scanning block 40, the quantized DCT coefficients are reconstructed to provide an original block of, for instance, 8×8 quantized DCT coefficients. Said block of quantized DCT coefficients is converted into a set of DCT coefficients in an inverse quantizing($Q^{-1}$) block 50 and fed to a "zero" masking block 60 which replaces those transform coefficients representing high frequency components thereof with "zeroes" in accordance with a preferred embodiment of the present invention.

The DCT coefficients have a statistic distribution in the frequency region between a d.c. component zone to a high frequency zone with non-zero or insignificant transform coefficients mainly appearing in the low frequency zone and the zero or insignificant transform coefficients appearing mainly in the high frequency zone. These high frequency components may be truncated or do not have to be utilized in generating reduced images such as multipicture subimages. Therefore, it may be advantageous to utilize the lower frequency zone only to reproduce, e.g., a plurality of subpictures in order to avoid aliasing effect.

As well known in the art, the DCT coefficients from a set of two-dimensional transform coefficients represent ever-increasing frequency components along a zigzag scanning path starting from a d.c. value located at the top-left corner of the set. In accordance with the preferred embodiment of the invention, those transform coefficients which fall outside a reduced DCT block including a d.c. coefficient are masked with zeroes so as to produce multipicture subimages.

In FIG. 3, there is illustrated a "zero" masking scheme performed in the "zero" masking block 60 in accordance with the invention. Supposing now that the DCT coefficients are of an 8×8 block, they represent 8×8 pixels as well known in the art. When the multipicture is composed of $N^2$ equal-sized subpictures(that is, each subpicture is reduced to 1/N, in both the horizontal and vertical lengths of the screen), the number of pixels of each subpicture is also reduced to 1/N in both the vertical and the horizontal directions (N=1,2,4 or 8 in this case). In the preferred embodiment of the invention, all the transform coefficients situated outside the subblock of 8/N×8/N, for instance, 4×4 with N=2, are set to zeroes. FIG. 3 illustrates the 8×8 DCT coefficient block processed at the "zero" masking block 60 with N=2, wherein the DCT coefficients in subblocks B, C and D are all set to zeroes, while the 4×4 subblock A retains those coefficients denoted by DC and X's.

Referring back to FIG. 1, the "zero" masking block 60 is controlled by a signal from the control block 130 designating a value for N. For instance, in the normal mode without multipicture display, the control block 130 dispatches a signal, with N=1, to the "zero" masking block 60, thereby enabling all the 8×8 transform coefficients retain their original values.

The 8×8 block of DCT coefficients, for example, including the subblock A retaining original values of its DCT coefficients and the subblocks B, C, D set to have all zero DCT coefficients as shown in FIG. 3, is applied to an inverse DCT($DCT^{-1}$) block 70. In a first embodiment of the invention, the entire 64 pixel difference data are generated by carrying out 8×8 inverse DCT at the $DCT^{-1}$ block 70 and transferred to a sampling block 80 for decimating the 8×8 block of pixel difference data into all 8/N×8/N block thereof under the control of the control block 130. In a second embodiment of the invention, the 8/N×8/N block of pixel difference data is directly calculated from said 8×8 DCT coefficients at the $DCT^{-1}$ block 70 under the control of the control block 130. In the latter embodiment of the invention, the output from the $DCT^{-1}$ block 70 is directly fed to an adder 110 without undergoing a further sampling process.

In the meantime, the motion vector MV from the VLD block 20, specifically, its horizontal vector component MVH and vertical vector component MVV, is modified under the control of the control block 130 into a reduced motion vector MV/N at the motion compensation block 90 to compensate the reduced size of the subpictures and fed to an interpolation block 100.

The motion vector MV reduced by a factor of N does not always coincide with the pixel position of the reduced subpicture frame stored in a respective memory subarea of a frame memory 120; and, therefore, a set of pixel data from the previous subpicture frame is interpolated in accordance with the invention at the interpolation block 100 under the control of the control block 130 and applied to the adder 110. Details of the interpolation process will be described hereinafter with reference to FIG. 4. The difference data from the sampling block 80 in the first embodiment or from the $DCT^{-1}$ block 70 in the second embodiment of the invention and the interpolated pixel data from the interpolation block 120 are added up at the adder 110 to provide an $8/N \times 8/N$ block signal for each current subpicture frame and written onto its assigned memory subarea in the frame memory 120.

Figure 4:
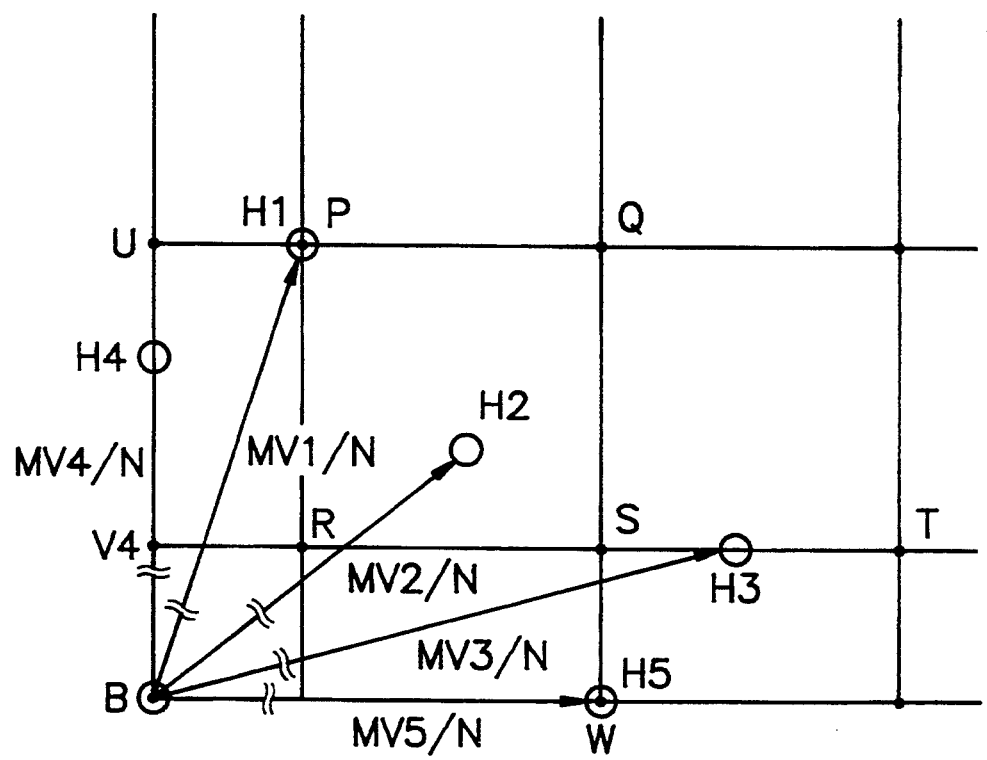
FIG. 4 illustrates an interpolation of pixel data performed at an interpolation block in accordance with the invention.

In FIG. 4, there is illustrated a spatial relationship between a pixel of a current subpicture frame and pixels on its preceding subpicture frame operated by a reduced motion vector MV/N. By definition, a motion vector operates from a base, which is a current pixel projected on its preceding frame, to a head which is a pixel on the preceding frame. In FIG. 4, $MVi/N(i=1,2,3,4,5)$ denotes a reduced motion vector operating from the base B to a head $Hi(i=1,2,3,4,5)$, respectively; B, P, Q, R, S, T, U, V and W are pixels on the preceding subpicture frame denoted by closed circles; and open circles signify the base B and the heads Hi's.

In a preferred embodiment of the invention, pixel data of a head Hi is derived directly from a pixel alone when Hi coincides therewith. For instance, H1 is derived from P, while H5 is derived from W.

Each of the pixel data of such heads that fall on a vertical or horizontal line which connects pixels, e.g., H3 or H4, is derived from its two neighboring pixels on the line by multiplying appropriate weight factors thereto. For instance, H3 is derived from S and T; and H4, from U and V.

In a situation where a head is situated inside a square formed by four nearest pixels therefrom, the pixel data thereof is interpolated from those four pixels by applying suitable weight factors thereto. The pixel data of H2, for instance, is derived from the four pixels P, Q, R and S.

In the preferred embodiment of the present invention, the weight factors are determined based on the reversed ratio of the distances between the head of a reduced motion vector and its two or four neighboring pixels. For example, the interpolated pixel data DH3 of head H3 is obtained by summing up the pixel data DS of S multiplied by a weight factor of $TH3/(SH3+TH3)$ and the pixel data DT of T multiplied by a weight factor of $SH3/(SH3+TH3)$, wherein SH3 is the distance between S and H3; TH3, the distance between T and H3. In other words, a larger weight factor is applied to a closer D pixel in accordance with the preferred embodiment. Similarly, the interpolated pixel data DH2 of head H2 is obtained by multiplying $(PH2+QH2+RH2+SH2)^{-1}$ to the sum of $DP \times SH2$, $DQ \times RH2$, $DR \times QH2$ and $DS \times PH2$, wherein DP, DQ, DR and DS are pixel data of P, Q, R and S, respectively; PH2, QH2, RH2 and SH2, distances between H2 and P, Q, R and S, respectively, with $PH2 > QH2 > RH2 > SH2$.

Referring back to FIG. 1, the reduced motion vector by a factor of N is fed from the motion compensation block 90 to the interpolation block 100 wherein the aforementioned interpolation process is performed. The interpolated pixel data from the interpolation block 100 is added to the pixel difference data from the sampling block 80 or the $DCT^{-1}$ block 70 at the adder 110 and written onto the assigned memory subarea of the frame memory 120 for storing the multipicture signal. The multipicture image signal stored in the frame memory 120 is converted into an analog form in the digital-to-analog converter(not shown) and transferred therefrom for display.

As a result, there is provided the novel method and system capable of providing high definition television receivers with a multipicture display capability, wherein the generation of the multiplicity of subpictures is performed by zero masking those DCT coefficients in the high frequency region thereby eliminating the need to employ, e.g., a complicated and costly digital low pass filter.

It should be appreciated that the weight factors, which are inversely proportional to the distances between a given head and its two or four nearest pixels in the preferred embodiment of the invention, may be chosen in different manners: for instance, they may be chosen to be inversely proportional to the square of the ratio of distances as long as use of such weight factors turns out to be more conducive to the reproduction of better picture images.

Further, decimation of, e.g., $8 \times 8$ pixel difference data into a reduced number of, e.g., $8/N \times 8/N$ pixel difference D data may be achieved by performing $8/N \times 8/N$ inverse DCT utilizing only an $8/N \times 8/N$ block of DCT transform coefficients including a d.c. coefficient without going through a "zero" masking process.

While the present invention has been described with respect to certain preferred embodiments only, other modifications and variations may be made without departing from the spirit and scope of the present invention as set forth in the following claims.

What is claimed is:

1. A method for use in a digitized video signal decoder for providing a plurality of equal-sized subpictures on a screen wherein said decoder has a storage means for providing said equal-sized subpictures, said method comprising the steps of:

selecting an encoded digital input video signal corresponding to each of said equal-sized subpictures frame by frame;

converting said encoded digital input video signal into multiple blocks of $P \times Q$ transform coefficients, wherein P and Q are positive integers;

setting to zeros said transform coefficients which lie outside a subblock of $P/N \times Q/N$ transform coefficients formed from each of said multiple blocks of $P \times Q$ transform coefficients thereby providing a zero-masked block of $P \times Q$ transform coefficients from each of said multiple blocks of $P \times Q$ transform coefficients, wherein said subblock of $P/N \times Q/N$ transform coefficients includes a d.c. transform coefficient; and P/N, Q/N and N are positive integers with N being a reduction ratio between each of said equal-sized subpictures and the screen with respect to both the horizontal and the vertical lengths thereof;

generating a set of $P/N \times Q/N$ pixel data from said zero-masked block of $P \times Q$ transform coefficients; and storing said set of $P/N \times Q/N$ pixel data in an assigned storage area of the storage means for providing said equal-sized subpictures on the screen.

2. The method according to claim 1, wherein said step of generating the set of $P/N \times Q/N$ pixel data includes the steps of:

inverse-transforming said zero-masked block of P×Q transform coefficients to a set of P×Q pixel data; and decimating said set of P×Q pixel data into the set of P/N×Q/N pixel data.

3. The method according to claim 1, wherein said step of generating the set of P/N×Q/N pixel data includes the step of inverse-transforming said zero-masked block of P×Q transform coefficients to the set of P/N×Q/N pixel data.

4. A digitized video signal decoding system for providing a plurality of equal-sized subpictures on a screen, comprising:

means for selecting an encoded digital input video signal corresponding to each of said equal-sized subpictures frame by frame;

means for converting said encoded digital input video signal into multiple blocks of P×Q transform coefficients, wherein P and Q are positive integers;

means for setting to zeros transform coefficients which lie outside a subblock of P/N×Q/N transform coefficients formed from each of said multiple blocks of P×Q transform coefficients thereby providing a zero-masked block of P×Q transform coefficients from each of said multiple blocks of P×Q transform coefficients, wherein said subblock of P/N×Q/N transform coefficients includes a d.c. transform coefficient; and P/N, Q/N and N are positive integers with N being a reduction ratio between each of said equal-sized subpictures and the screen with respect to both the horizontal and the vertical lengths thereof;

means for generating a set of P/N×Q/N pixel data from said zero-masked block of P×Q transform coefficients; and storage means, having storage area for storing said equal-sized subpictures, for storing said set of P/N×Q/N pixel data in an assigned portion of said storage area.

5. The system according to claim 4, wherein said means for generating the set of P/N×Q/N pixel data includes:

means for inverse-transforming said zero-masked block of P×Q transform coefficients to a set of P×Q pixel data; and means for decimating said set of P×Q pixel data into the set of P/N×Q/N pixel data.

6. The system according to claim 4, wherein said means for generating the set of P/N×Q/N pixel data includes means for inverse-transforming said zero-masked block of P×Q transform coefficients to the set of P/N×Q/N pixel data.

* * * * *